UNITED STATES PATENT OFFICE.

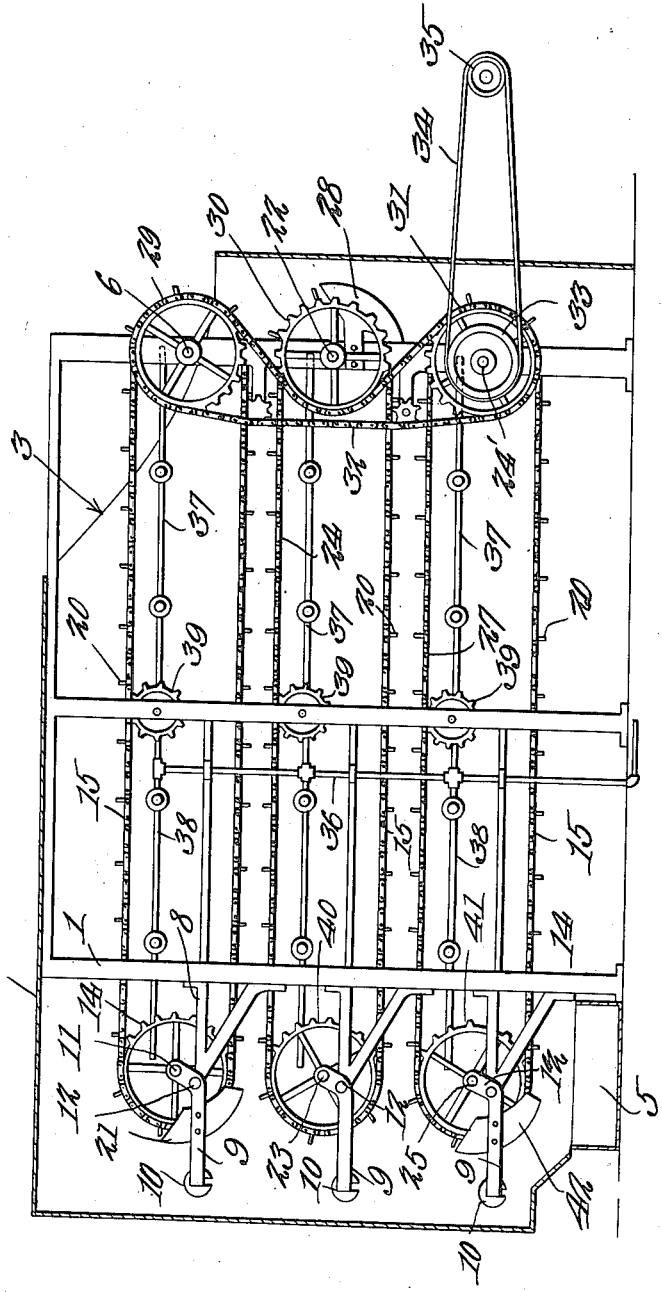

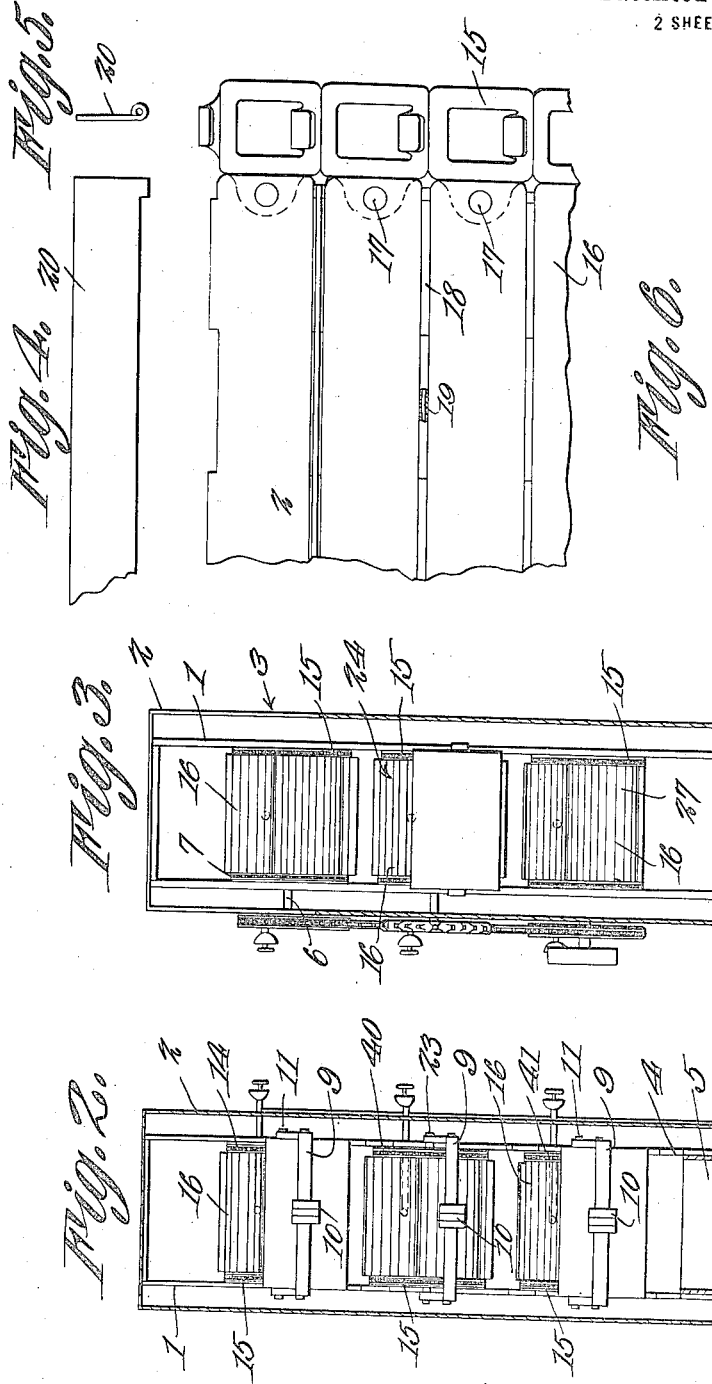

PABLO GONZALEZ GARZA, OF MONTEREY, MEXICO.

MACHINE FOR COOKING TORTILLAS.

1,280,205.  Specification of Letters Patent.  Patented Oct. 1, 1918.

Application filed November 12, 1915. Serial No. 61,104.

*To all whom it may concern:*

Be it known that I, PABLO GONZALEZ GARZA, a citizen of the Republic of Mexico, residing at Monterey, Mexico, in the Republic of Mexico, have invented a new and useful Machine for Cooking Tortillas, of which the following is a specification.

The device forming the subject matter of this application is adapted to be employed for baking tortillas, a kind of Mexican cake or flap-jack made out of corn, the corn being boiled in a weak lime water, ground and mashed into a thick dough, after which it is pressed out into cakes. The present invention does not relate to the making of the cakes, but provides a means whereby the same may be baked.

The invention aims to provide novel means for advancing the cakes and for subjecting the cakes to the action of a heating or baking means, to provide novel means for reversing the cakes, as the cakes are delivered from one conveyer to another, to provide novel means for maintaining the conveyers taut and, generally, to improve and enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:

Figure 1 shows in side elevation, a machine embodying the present invention, the inclosing casing appearing in section;

Figs. 2 and 3 are transverse sectional views, showing opposite ends of the machine;

Fig. 4 is a fragmental plan showing one of the plates which go to make up the conveyers;

Fig. 5 is an end elevation of the structure shown in Fig. 4;

Fig. 6 is a fragmental plan of one of the conveyers.

The machine forming the subject matter of this application embodies a frame 1 which may be variously constructed without jeopardizing the utility of the invention. Inclosing the frame 1 is a casing 2, preferably made of metal, the casing constituting a means whereby the cakes are prevented from being cooled off, while the same are being baked. At one end and at its upper corner 3, the casing 2 is cut away, so that the cakes may be inserted readily into the machine to be baked. At the diagonally disposed lower corner, the casing 2 is cut away as shown at 4, to receive a removable receptacle 5 in which the baked cakes ultimately are deposited.

Journaled for rotation in the frame 1 adjacent the opening 3 is a shaft 6 carrying sprocket wheels 7. The frame 1 includes brackets 8 upon which are fulcrumed U-shaped levers 9, the fulcrums of the levers being indicated at 12. The levers 9 include upstanding arms in which is journaled for rotation a shaft 11 carrying sprocket wheels 14. About the sprocket wheels 7 and 14 at the sides of the frame 1 are trained chains 15, connected by transverse plates 16 held to the links of the chains by means of securing elements 17, the adjacent edges of the plates 16 preferably being provided with eyes 18 receiving pintles 19, the construction being such that one plate is hingedly connected with an adjoining plate. The plates of the conveyer above described are provided with upstanding projections 20 which serve to engage the cakes, to the end that the cakes may be advanced along with the conveyer. The lever 9 carries an arcuate, trough-shaped cake turner 21, the function and utility of which will be set forth hereinafter.

The turner 21 acts as a weight for the lever 9, and the lever 9, in its turn, constitutes a means for tightening up the conveyer comprising the chains 15. If desired, however, movable weights 10 may be straddled onto the bend of the lever 9. Intermediate its ends, the conveyer above described and the conveyers to be described hereinafter are supported beneath their upper runs, by means of sprocket wheels 39 journaled on the frame 1 adjacent its sides.

Journaled for rotation in the frame 1 below the shaft 6 is a shaft 22. A shaft 23 is mounted at the opposite end of the frame, in a manner similar to the mounting of the shaft 11. The shafts 22 and 23 carry sprocket wheels 40 about which is trained a conveyer 24, constructed like the conveyer above described. Below the shaft 22, a shaft 24' is journaled in the frame 1, and below the shaft 23, a shaft 25 is carried by a lever, as hereinbefore set forth. The shafts 24' and 25 carry sprocket wheels 41 about which is trained a conveyer 27, of the sort hereinbefore set forth. A trough-shaped, cake turner 28 is carried by the frame 1 and coöperates with the right hand end of the conveyer 24, there being a cake turner 42 carried by a lever, as above described, and located at the left hand end of the conveyer 27 and above the receptacle 5.

Fixed to the end of the shaft 6 is a sprocket wheel 29, the shaft 22 carrying a sprocket wheel 30, and the shaft 23 carrying a sprocket wheel 31. A drive chain 32 is looped about the sprocket wheels 29 and 31, both runs of the sprocket chain 32 being located to one side of the sprocket wheel 30, and one of said runs coacting with the sprocket wheel in a manner which will be entirely obvious from Fig. 1. Attached to the shaft 24' is a pulley 33 about which is trained a belt 34 operatively connected with a prime mover indicated diagrammatically at 35.

Any suitable means may be provided for heating the several conveyers above described. If desired, a gas supply pipe 36 may consitute a part of the invention, the pipe 36 communicating with longitudinal pipes 37, individual to the several conveyers, the pipes 37 being equipped with burners 38 operating beneath the conveyers.

In practical operation, motion is transmitted to the shafts 23, 22 and 6 and to the several conveyers, by means of the belt 34 and the sprocket chain 32. The cakes, in an unbaked condition, are placed on the upper run of the upper conveyer, through the opening 3. The upper run of the upper conveyer travels to the left, and by means of the cake turner 21, the cakes are reversed and deposited on the upper run of the conveyer 24, the said upper run of the conveyer moving to the right, the cakes being reversed by the turner 28 and being deposited on the upper run of the lower conveyer 27, the upper run of the lower conveyer 27 moving to the left, and the cakes being reversed by the turner 42, as the cakes drop into the receptacle 5.

The machine forming the subject matter of this application will bake the cakes rapidly, will reverse them at the proper time and produce a spongy and satisfactory article.

Having thus described the invention, what is claimed is:—

1. In a device of the class described, a frame; a sprocket wheel journaled on the frame; a lever fulcrumed on the frame; a sprocket wheel carried by the lever; a conveyer passed about the sprocket wheels; a cake turner carried by the lever and constituting a counterweight therefor, the turner coöperating with the conveyer; means for receiving the cake from the turner; and means for heating the conveyer.

2. In a machine of the class described, a frame; a first belt conveyer mounted to traverse the frame; means for heating the conveyer; a tightening means for the conveyer; a cake turner coöperating with the conveyer and carried by the tightening means, the turner constituting a means for actuating the tightening means with respect to the conveyer, and a second conveyer upon which the cake turner discharges.

In testimony that I claim the foregoing as my own, I have hereto affixed my signature in the presence of two witnesses.

PABLO GONZALEZ GARZA.

Witnesses:
R. M. MARTINEZ,
JUAN V. REYES.